United States Patent
Aithal et al.

(10) Patent No.: US 10,298,577 B1
(45) Date of Patent: May 21, 2019

(54) CREDENTIAL VENDING TO PROCESSES

(71) Applicant: Amazon Technologies, Inc., Seattle, WA (US)

(72) Inventors: Anirudh Balachandra Aithal, Seattle, WA (US); Kiran Kumar Meduri, Bellevue, WA (US); Samuel Benjamin Karp, Seattle, WA (US); Juan Rhenals, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 537 days.

(21) Appl. No.: 15/087,913

(22) Filed: Mar. 31, 2016

(51) Int. Cl.
  *H04L 29/06* (2006.01)
  *G06F 9/455* (2018.01)

(52) U.S. Cl.
  CPC ...... *H04L 63/0884* (2013.01); *G06F 9/45558* (2013.01); *H04L 63/102* (2013.01); *G06F 2009/45595* (2013.01)

(58) Field of Classification Search
  CPC .............. H04L 63/0884; H04L 63/102; G06F 9/45558; G06F 2009/45595
  See application file for complete search history.

(56) References Cited

U.S. PATENT DOCUMENTS

| | | | | |
|---|---|---|---|---|
| 7,173,928 B2* | 2/2007 | Xu | ....................... | H04L 29/125 370/352 |
| 2002/0116523 A1* | 8/2002 | Warrier | ............. | H04L 29/12009 709/238 |
| 2005/0204356 A1* | 9/2005 | Sundararajan | ............ | G06F 8/61 717/176 |
| 2006/0248225 A1* | 11/2006 | Batz | .................. | H04L 29/12367 709/238 |
| 2010/0195635 A1* | 8/2010 | Maeda | .................... | H04W 8/26 370/338 |

(Continued)

OTHER PUBLICATIONS

Guo et al, Anonymous Credential-Based Privacy-Preserving Identity Verification for Business Processes, Jul. 2014, Eighth International Conference on Innovative Mobile and Internet Services in Ubiquitous Computing, pp. 554-559 (Year: 2014).*

(Continued)

*Primary Examiner* — Kenneth W Chang
(74) *Attorney, Agent, or Firm* — Davis Wright Tremaine LLP

(57) ABSTRACT

An application is comprised of a plurality of processes. A process is able to accesses a remote service using a service access credential which is adapted to the particular requirements of the process. By providing a process with customized credential, the process is constrained from performing unnecessary operations, and the overall security of the application is improved. When processes are deployed to a host computer, an agent on a host computer collects credential information and other metadata associated with the processes running on the host computer. The agent makes the metadata available to a credential provider running on the host, and the credential provider exposes an interface that is accessible to the processes. The processes include a credential proxy which communicates with the credential provider. The credential proxies relay credential requests to the credential provider, and return the provided credentials from the credential provider to the processes.

19 Claims, 11 Drawing Sheets

(56) References Cited

U.S. PATENT DOCUMENTS

| | | | | |
|---|---|---|---|---|
| 2010/0205240 A1* | 8/2010 | Loefstrand | .......... | H04L 67/2814 |
| | | | | 709/203 |
| 2010/0217882 A1* | 8/2010 | Yang | .................. | H04L 12/4633 |
| | | | | 709/229 |
| 2012/0295587 A1* | 11/2012 | Paya | .................. | H04L 63/0492 |
| | | | | 455/411 |
| 2014/0280955 A1* | 9/2014 | Stuntebeck | ......... | H04L 63/0435 |
| | | | | 709/226 |
| 2014/0282894 A1* | 9/2014 | Manton | ................ | H04L 63/102 |
| | | | | 726/4 |
| 2015/0181014 A1* | 6/2015 | Gerhardt | ............ | G07C 9/00309 |
| | | | | 455/420 |
| 2015/0379259 A1* | 12/2015 | Mohammed | ............ | G06F 21/45 |
| | | | | 726/6 |

OTHER PUBLICATIONS

"Amazon ECS Task Definitions," Amazon Web Services, Inc. ©2016, <http://docs.aws.amazon.com/AmazonECS/latest/developerguide/task_defintions.html> [retrieved Mar. 23, 2016], 2 pages.

"What Is a Docker?," Docket ©2016, <https://www.docker.com/what-docker> [retrieved Mar. 23, 2016], 10 pages.

* cited by examiner

CREDENTIAL VENDING TO PROCESSES

BACKGROUND

Many computer applications rely at least partially on access to remote services to implement a portion of their functionality. For example, an application running on a computer system may submit service requests to remote services such as storage services, backup services, key management services, and cloud-computing services. The service requests are authenticated and authorized using credentials. The credentials are issued to the application by the provider of the remote service, and grant access rights that are necessary to fulfill the service requests. Some applications are comprised of a plurality of processes, and different processes may access a different set of remote services in different ways. If a number of processes require different access rights, the credentials provided by the remote service provider to the application may grant the union of the required access rights. This may result in some processes receiving access rights that are greater than what is necessary.

This can be particularly problematic if the processes have very different or conflicting access requirements. For example, a first process may require access to a storage volume owned by a first customer, while a second process may need to be denied access to the storage volume owned by the first customer. In another example, a first process may require administrative access privileges, whereas a second process may require only minimal access rights. If credentials are issued on a per-application or per-host basis, many processes may be forced to share the same access rights and privileges, creating an unnecessary security risk. Therefore, adjusting the credentials that are supplied to each process is an important problem.

BRIEF DESCRIPTION OF THE DRAWINGS

Various techniques will be described with reference to the drawings, in which.

DETAILED DESCRIPTION

Figure 1:
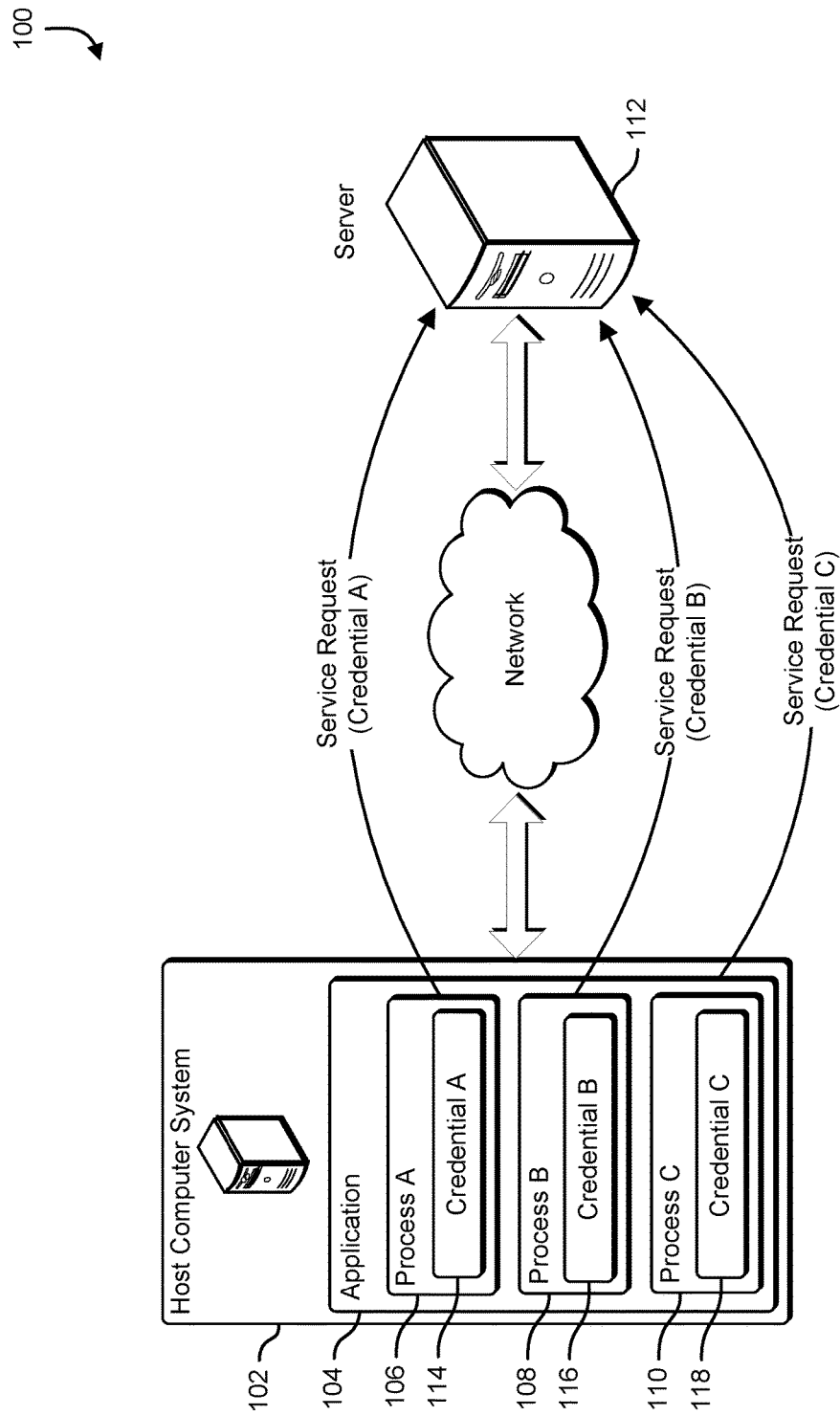
FIG. 1 shows an illustrative example of an environment in which various embodiments may be practiced.

The current document describes a system that improves the security of information by providing, to individual processes of an application, a credential adapted to the particular requirements of the process. Rather than sharing a credential associated with an associated host computer system or application, different processes of the application can be provided with different credentials, and an issued credential can be adapted to the particular rights and permissions necessary for the associated process. Since credentials need not be shared, rights or permissions granted to one process need not be granted to another process. Various processes of an application may be isolated from each other. For example, processes may be isolated from each other by placing the processes in different memory spaces, on different virtual machines, or in different containers. The systems and methods described in this document allow the credentials to be distributed to the processes despite these obstacles.

In some examples, the application is implemented using a number of processes running in containers. Containers provide operating-system-level virtualization. Compared to hardware-level virtual machines, containers do not provide hardware emulation, and share access to underlying hardware and host operating system features. Containers allow a process and its resources to be isolated and bound together using a namespace, and further arrangements of resources for the process are also possible. One or more containers can be hosted using a container runtime running on a host computer system. The host computer system can be a server computer system, server cluster, or a virtual machine ("VM").

As part of deploying a container to a host computer system, a container definition is provided by a customer to an agent running on the host computer system. The container definition provides metadata such as operational parameters, credentials, and roles that are associated with the containers used to implement the application. The container definition may identify, for a container, credentials and roles for the container, an executable image for the container, CPU and memory use requirements, identities of related containers, network configuration for the container, and environment variables to be provided to the container upon startup. The agent on the host computer system collects the metadata from the container definition, and stores the information in a database accessible to the agent. Container metadata from the container definition, such as credential and role information for the containers, is made available to a credential provider running on the host computer system.

The credential provider is a service running on the host computer system for the purpose of providing the credentials and/or other container-related metadata to the containerized processes. The credential provider is responsible for identifying the container making the request, and for vending the credential to the container. The credential provider exposes an interface that is accessible to the containerized processes. In some implementations, the interface is a predetermined network address and port. As part of configuring a container, the agent configures the networking stack of the container to direct credential requests to the predetermined network address and port exposed by the credential provider. In some implementations, the credential provider runs within a hypervisor domain, as a remote service on another computer system, or as a virtual private cloud ("VPC") endpoint.

Each container includes a credential proxy that runs within the namespace of the container. The credential proxy communicates with the credential provider on behalf of the container. The credential proxy relays requests for credentials to the credential provider and applies identifying information that authenticates the request and identifies the particular container to the credential provider. In some implementations, a secret-sharing scheme between the credential proxy and the credential provider provides authentication and identification functionality to the credential-acquisition process.

In some examples, use of the credential provider is optional, and a container is able to submit requests for credentials that are not directed to the interface exposed by the credential provider. Instead, the requests are forwarded to an instance metadata service running on a host computer system. The host computer system hosts a virtual machine instance which, in turn, hosts the container. The container is able to access metadata, including credentials, for the virtual machine instance. In some implementations, the container accesses both metadata associated with the virtual machine instance and metadata associated with the container. Virtual machine instance metadata is accessed by the instance metadata service on the host computer system, and container metadata is accessed using the credential provider running on the virtual machine instance.

FIG. 1 shows an illustrative example of an environment in which various embodiments may be practiced. An environment 100 includes a host computer system 102 that hosts an application 104. The host computer system may be a physical computer system, a cluster of computer systems, or virtual computer system. The application 104 includes a number of processes; Process A 106, Process B 108, and Process C 110. The application 104 may include additional processes hosted on other computer systems. In some implementations, the processes are processes separated into different memory spaces of the application. In another implementation, the processes are processes running within different containers. In yet another implementation the processes are processes running in different virtual machines.

The processes associated with the application 104 utilize one or more remote services provided by a server computer system 112. The remote services may include storage services, computing services, encryption services, key management services, Web services, payment processing services, database services, or other online services. The processes submit service requests to the remote services on the server computer system 112. The service requests are authorized based at least in part on a credential associated with each request. Processes associated with the application 104 are able to supply a different credentials to the server computer system 112. In the example shown in FIG. 1, Process A 106 submits a service request with a Credential A 114, Process B 108 submits a service request with Credential B 116, and Process C 110 submits a service request with Credential C 118. The particular credential used by a process grants, to the process, rights and permissions to access the remote services in accordance with the specific requirements of the process.

In various examples, application metadata is distributed to a process when the process is deployed to a computing resource such as a container or a virtual machine. Application metadata may include process information such as credentials, security roles, process identifiers, operational parameters, and cryptographic keys.

Applications can be constructed from a number of processes that are hosted on one or more computer systems, servers, or server clusters. Processes may be run in separate memory spaces, or in the case of threads, may share a memory space with other processes. Some processes may be hosted in a virtualization layer such as a container or virtual machine.

Processes may communicate with each other, and/or a central application controller via inter-process communication, networking calls, named pipes, or through a filesystem.

Figure 2:
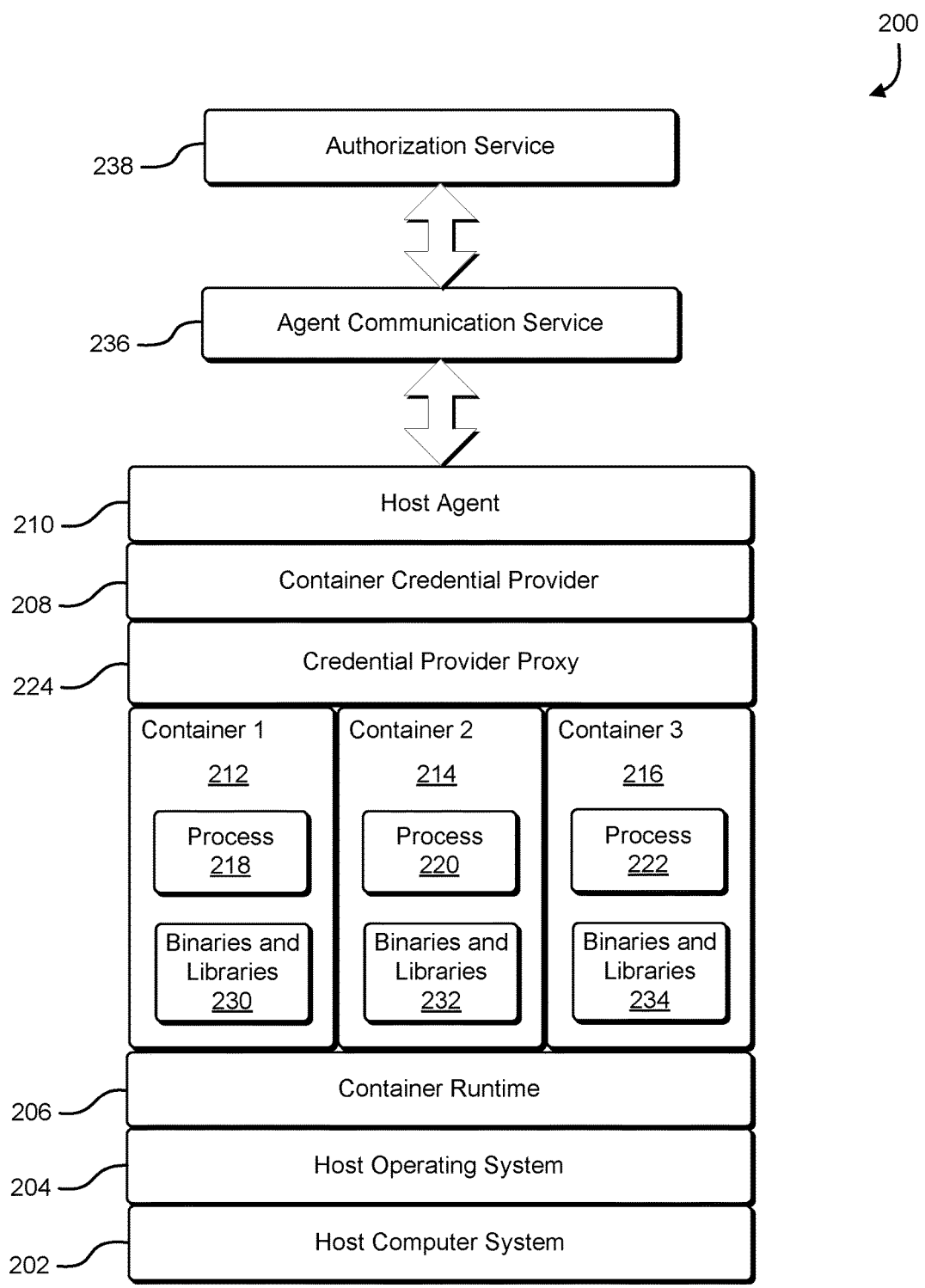
FIG. 2 shows an illustrative example of a host computer system that hosts a number of containerized processes, where the containerized processes are able to receive and use different credentials when accessing a remote service.

FIG. 2 shows an illustrative example of a host computer system that hosts a number of containerized processes, where containerized processes are able to receive and use a different credentials when accessing a remote service. An environment 200 shows a number of processes running in containers which are hosted by a host computer system 202. The host computer system can be a server computer system, a virtual computer system, or a cluster of server computer systems. The host computer system 202 runs a host operating system 204 such as a version of Windows, Mac OS, or UNIX. A container runtime 206, a container credential provider 208, a host agent 210, and a credential provider proxy 224 run on top of the host operating system 204.

The container runtime 206 provides a virtualization layer for hosting containerized processes. Each container provides an execution environment for a process. The environment includes a dedicated file system and namespace, but shares an underlying operating system and supporting hardware. In the example shown in FIG. 2, the container runtime 206 supports three containers; a first container 212, a second container 214, and a third container 216. Each container includes a process, and a set of binaries and libraries that are used by the process. The first container 212 includes a first process 218, and a first set of binaries and libraries 230. The second container 214 includes a second process 220, and a second set of binaries and libraries 232. The third container 216 includes a third process 222, and a third set of binaries and libraries 234. In some implementations, one or more of the containers may share some binaries and libraries. For example, the first container 212 and the second container 214 may share a fourth set of binaries and libraries between them. The credential provider proxy is responsible for acquiring credentials for the associated container from the container credential provider 208.

The container credential provider 208 is a service that runs on the host operating system 204. The container credential provider 208 provides an interface that is accessible to the containers via the credential provider proxies. In some implementations, the container credential provider 208 provides a network interface to the credential provider proxies in the form of a designated network address and port. The networking stacks provided to the containers are modified so that network traffic addressed to the designated network address and port from within the container is redirected to the interface of the container credential provider 208. Processes within the containers request credentials via the credential provider proxy. Each process can add information to the request for identifying the container and authenticating the request. The request is directed by the credential provider proxy to the designated network address and port, but is redirected by the network stack to the container credential provider 208. The container credential provider 208 identifies the container from which the request was sent, and responds with a credential appropriate to the identified container.

The host agent 210 is a service running on the host operating system 204 that is responsible for collecting metadata related to the containers hosted on the host computer system 202. The host agent 210 communicates through an agent communication service 236 with an authorization service 238, and with other services that manage the processes running on the host computer system 202. The host agent 210 receives container definitions which specify the credentials to be used with various processes. In some examples, the host agent 210 manages the expiration and renewal of the credentials on behalf of the containers. The host agent 210 provides the credential information to the container credential provider 208.

In some implementations, processes are deployed to the host computer system 202 along with a container definition file. The container definition file is supplied to the host agent 210 via the agent communication service 236. The host agent 210 parses the container definition file and extracts container metadata which is saved in a data store accessible to the host agent 210. The container metadata includes executable images, resource requirements for the container, credentials for use by the container, and identifying information such as cryptographic keys used to authenticate requests from the container. The container metadata is provided by the host agent 210 to the container credential provider 208.

When the container is launched, the host agent 210 configures the credential provider proxy 224 by providing the credential provider proxy with the information necessary to authenticate a request for a credential. To retrieve the credential, a process running within a container space submits a request via the credential provider proxy 224 to the container credential provider 208. The container credential provider 208 authenticates and authorizes the request, and provides the appropriate credentials to the container.

If the credentials assigned to a container are about to expire, the host agent 210 can renew the credentials. In some examples, the host agent 210 periodically examines the expiration time for credentials being used by processes hosted on the host computer system 202. If a particular credential is about to expire, the host agent 210 sends a request via the agent communication service 236 to the authorization service 238, requesting renewal of the particular credential. The updated credential is received by the host agent 210 from the authorization service 238. The host agent 210 stores the updated credential, along with a new expiration time in a database accessible to the host agent 210. The updated credential is provided to the container credential provider 208, and future requests from the containers will receive the updated credential.

Figure 3:
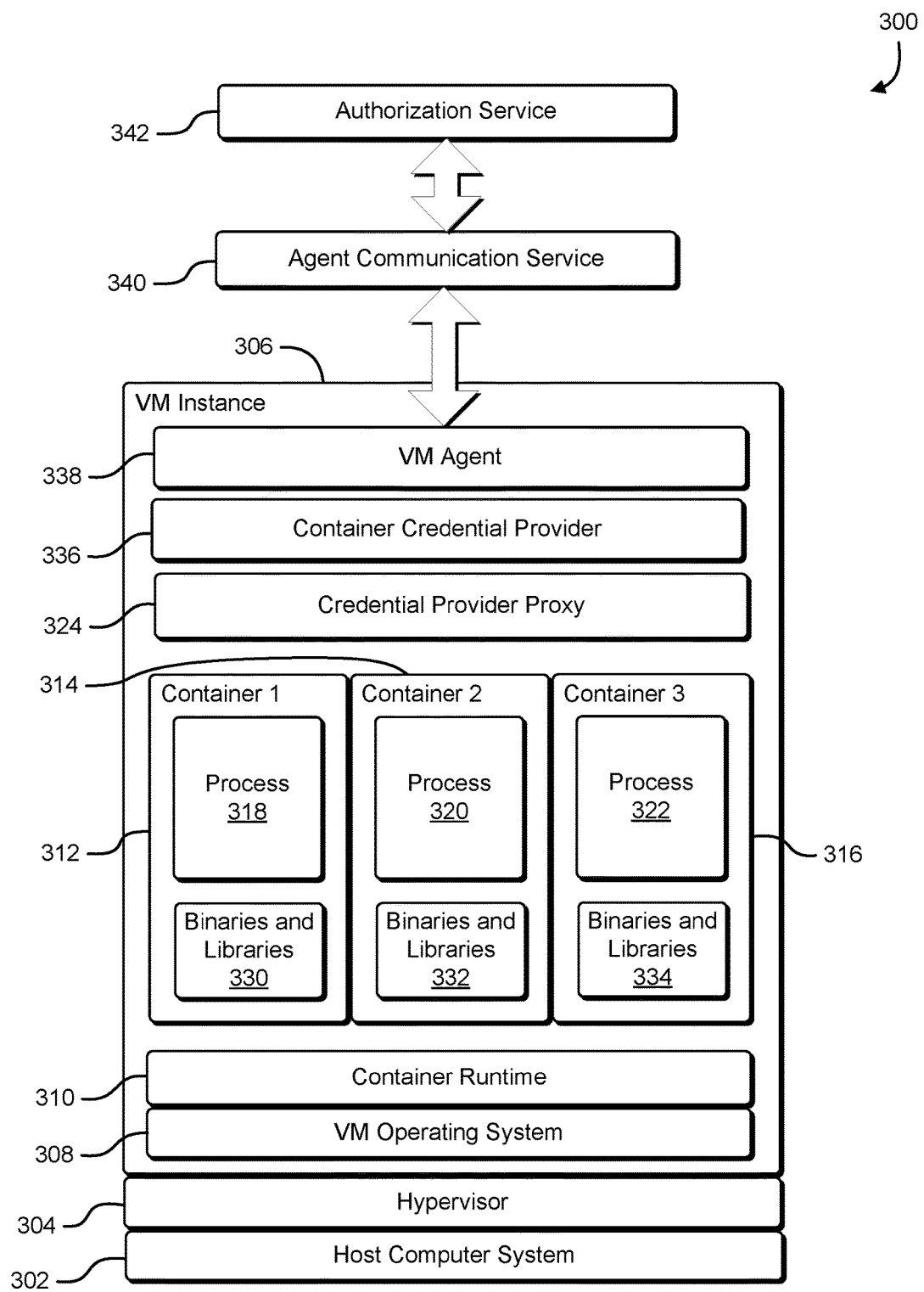
FIG. 3 shows an illustrative example of a host computer system that hosts a number of containerized processes within a virtual machine, where the containerized processes are able to receive and use different credentials when accessing a remote service.

FIG. 3 shows an illustrative example of a host computer system that hosts a number of containerized processes within a virtual machine, containerized processes are able to receive and use different credentials when accessing a remote service. An environment 300 shows a number of processes running in containers. The processes are hosted within a virtual machine instance, and the virtual machine instance is hosted by a host computer system 302. The host computer system 302 can be a server computer system, or a cluster of server computer systems. The host computer system 302 runs a hypervisor 304. The hypervisor 304 is a virtualization layer that supports the operation and management of virtual machine instances. A VM instance 306 runs on the hypervisor 304. The VM instance 306 includes a VM operating system 308 and a container runtime 310. The container runtime 310 supports a number of containers, each of which includes a process, and a number of supporting binaries and libraries. The VM instance 306 also includes a container credential provider 336 and a VM agent 338.

The container runtime 310 provides a virtualization layer for hosting containerized processes. In the example shown in FIG. 3, the container runtime 310 supports three containers; a first container 312, a second container 314, and a third container 316. Each container includes a process, and a set of binaries and libraries that are used by the process. The first container 312 includes a first process 318, and a first set of binaries and libraries 330. The second container 314 includes a second process 320, and a second set of binaries and libraries 332. The third container 316 includes a third process 322, and a third set of binaries and libraries 334. In some implementations, one or more of the containers may share some binaries and libraries. For example, the first container 312 and the second container 314 may share a fourth set of binaries and libraries between them. The credential provider proxy 324 is responsible for acquiring credentials for the associated container from the container credential provider 336.

The container credential provider 336 is a service that runs within the VM instance 306. The container credential provider 336 provides an interface that is accessible to the containers via the credential provider proxies. In some implementations, the container credential provider 336 provides a network interface to the credential provider proxies in the form of a designated network address and port. The networking stack of the VM instance 306 is modified so that network traffic addressed to the designated network address and port from within the container is redirected to the interface of the container credential provider 336. A process within a container may request credentials using the credential provider proxy 324. Each process can add information to the request for identifying the container and authenticating the request. The request is directed by the credential provider proxy 324 to the designated network address and port, but is redirected by the network stack to the container credential provider 336. The container credential provider 336 identifies the container from which the request was sent and validates the request. In some implementations, the container credential provider 336 identifies the container from which the request was sent by examining the source information in the network packets that contain the request. In another implementation, the container credential provider 336 identifies the container from which the request was sent by confirming a digital signature on the request. If the credential request is authenticated by the container credential provider 336, the container credential provider 336 provides the requested credential to the identified container.

The VM agent 338 is a service that runs on the VM instance 306. The VM agent 338 is responsible for collecting metadata associated with the containers hosted on the VM instance 306. The VM agent 338 communicates with outside services via an agent communication service 340. The VM agent 338 receives container definition files for processes deployed on the VM instance 306. Information in the container definitions provide credentials that are to be used with various processes. The VM agent 338 makes the credential information available to the container credential provider 336.

When a container is launched, the VM agent 338 configures the credential provider proxy 324 so that the credential proxy 324 is able to route credential requests from the container to the container credential provider 336. When a process running in the container makes a request for a credential, the request is relayed by the credential provider proxy 324 to the container credential provider 336. The process adds authenticating information to the request so that the container credential provider 336 is able to identify the container. Once the request is received, the container credential provider 336 authenticates and authorizes the request, and provides the appropriate credential to the process.

In some implementations, the VM agent 338 renews the credentials on behalf of the containers. If the credentials assigned to a container are about to expire, the VM agent 338 renews the credentials. In some examples, the VM agent 338 periodically examines the expiration time for credentials being used by processes hosted on the VM instance 306. If a particular credential is about to expire, the VM agent 338 sends a request via the agent communication service 340 to the authorization service 342, requesting renewal of the particular credential. The updated credential is received by the VM agent 338 from the authorization service 432. The VM agent 338 stores the updated credential, along with a new expiration time in a database accessible to the VM agent 338. The updated credential is provided to the container credential provider 336, and future requests from the containers will receive the updated credential.

Figure 4:
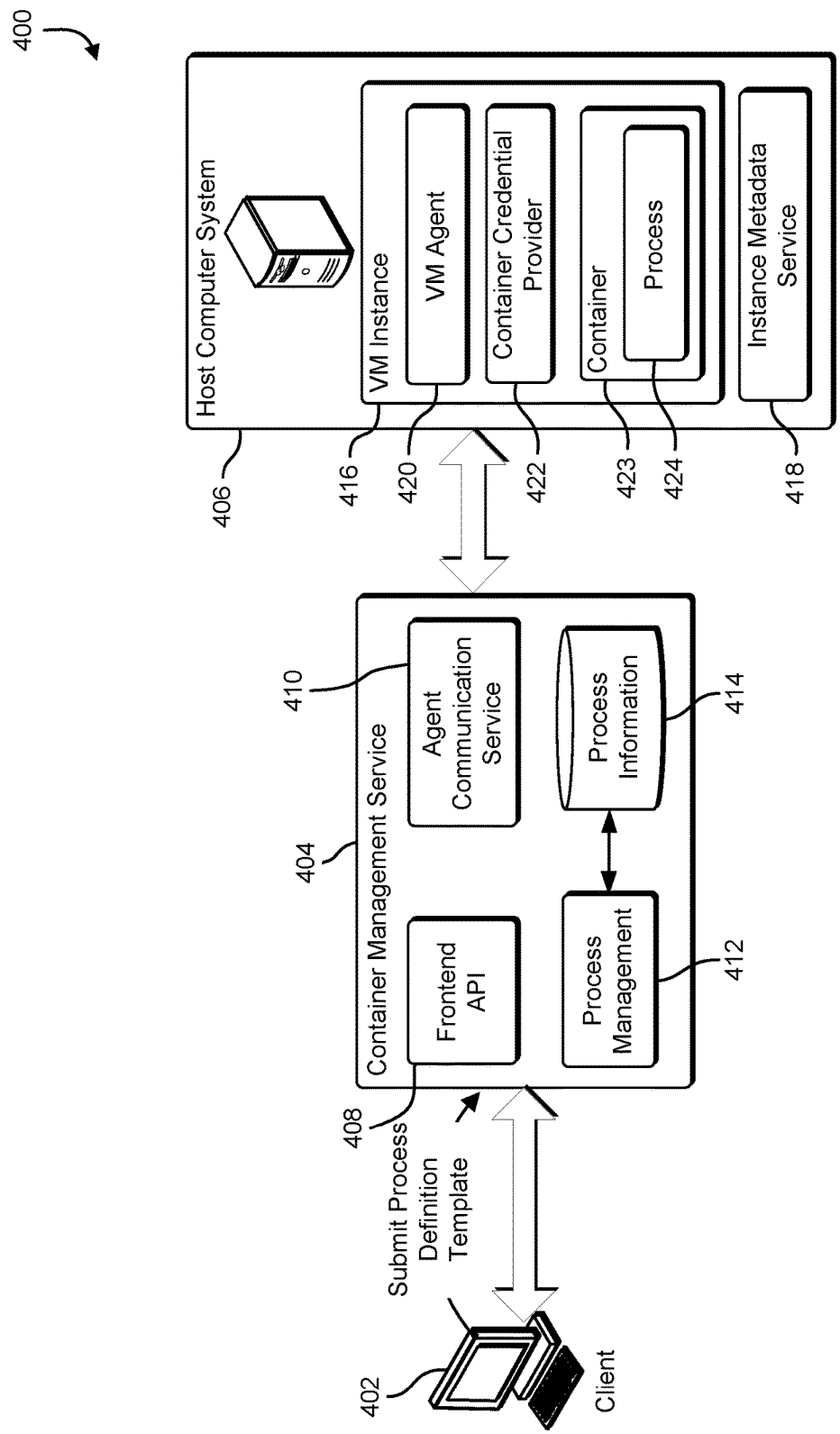
FIG. 4 shows an illustrative example of a container management service that manages container definitions, and application metadata for processes that are assigned to a host computing resource.

FIG. 4 shows an illustrative example of a container management service that manages container definitions and application metadata for processes that are assigned to a host computing resource. A computing environment 400 includes a client computer system 402, a container management service 404, and a host computer system 406. The container management service 404 is a service that provides a front-end application programming interface to the client computer system for launching and managing containerized applications and processes. The container management service 404 may run on a host computer system or on a dedicated server or server cluster separate from the host computer systems used to run containerized processes. The host computer system 406 is the server computer system or server cluster used by the container management service 404 for hosting containerized processes.

The container management service 404 includes a frontend API 408, an agent communication service 410, a process management service 412, and a process information database 414. The frontend API 408 exposes an interface to the client computer system 402 for executing and managing applications and processes. The agent communication service 410 is a service within the container management service 404 that provides a communication link between the container management service 404 and the host computer system 406. The process management service 412 deploys, starts, and stops containerized processes on the host computer system 406. The process information database 414 maintains information used to manage the applications and processes on the host computer system 406.

The host computer system 406 includes a VM instance 416, and an instance metadata service 418. The VM instance 416 is a virtual machine instance hosted by the host computer system 406. The instance metadata service 418 captures metadata such as credentials, configuration information, networking configuration, and resource requirements associated with the VM instance 416. In some examples, the instance metadata is provided when the VM instance 416 is deployed onto the host computer system 406. The instance metadata service 418 provides an interface that allows processes running within the VM instance 416 to access the metadata.

The VM instance 416 includes a VM agent 420, a container credential provider 422, and a process 424 that runs within a container 423. The VM agent 420 captures metadata associated with the process 424. In some examples, the container definition template supplied by the client computer system 402 to the container management service 404 is forwarded to the VM agent 420 using the agent communication service 410. The VM agent 420 parses information from the container definition template and retains the information in a data store accessible to the VM agent 420. The metadata provided to the VM agent 420 includes specific credentials used by the process 424. The credentials are provided by the VM agent 420 to the container credential provider 422. The container credential provider 422 provides an interface that is accessible by the process 424. In some implementations, the VM instance 416 hosts a plurality of container processes, and the plurality of container processes are able to retrieve credentials by sending requests to the interface of the container credential provider 422. The container credential provider 422 identifies the particular container requesting credentials, and vends the appropriate credential based at least in part on the identity of the requester. In this way, a containerized process is able to receive a unique credential adapted to the needs of the process.

Figure 5:
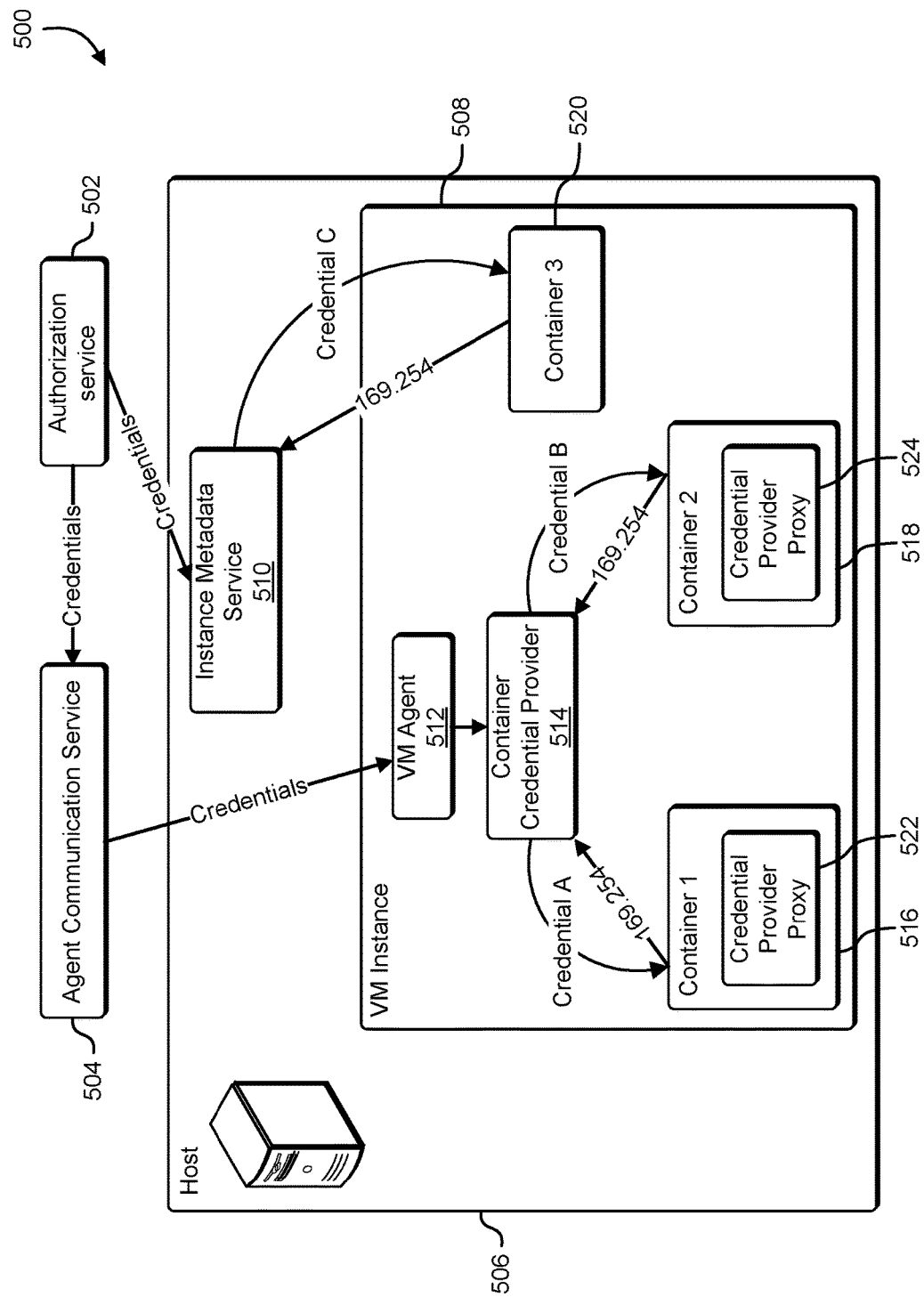
FIG. 5 shows an illustrative example of a host computer system that distributes credentials in accordance with application metadata to containers that are deployed on the host computer system.

FIG. 5 shows an illustrative example of a host computer system that distributes credentials in accordance with application metadata to containers that are deployed on the host computer system. A container-hosting environment 500 includes an authorization service 502 and an agent communication service 504 which provide credentials to containers hosted by a host computer system 506. The host computer system 506 is a server or server cluster that runs a hypervisor. The hypervisor allows the host computer system to support one or more virtual machine instances. In the example shown in FIG. 5, the host computer system 506 hosts a VM instance 508 and an instance metadata service 510. The instance metadata service 510 may run in the domain of the hypervisor or on top of an operating system running on the host computer system 506. The instance metadata service 510 collects information associated with the VM instance 508 such as VM configuration information, networking information, credentials assigned to the VM instance 508, or other VM-instance metadata. The instance metadata service 510 exposes a web interface using a designated IP address and port. In some examples, the network stack of the VM instance 508 is configured to redirect requests to the designated IP address and port to the instance metadata service 510. In this way, containers and other processes within the VM instance 508 can access metadata associated with the VM instance.

The VM instance 508 includes a VM agent 512, a container credential provider 514, and a number of containers. Each container runs a process in an isolated namespace. The VM agent 512 receives credential information for the containers when the containers are deployed to the VM instance 508. The credential information is retained by the VM agent 512 in a database accessible to the VM agent 512.

When a container is started, the associated credential information and container-identifying information is provided by the VM agent 512 to a container credential provider 514. The container credential provider 514 exposes an interface that is accessible to the containers running within the VM instance 508. When a container is started, a credential provider proxy is run within the container, and the networking stack of the container is configured to redirect requests to a designated IP address and port to the interface of the container credential provider 514.

The instance metadata service 510 and the container credential provider 514 may be used to provide credentials to the containers running within the VM instance 508. In the environment shown in FIG. 5, a first container 516 and a second container 518 are configured to receive credentials from the container credential provider 514. A third container 520 is configured to receive credentials from the instance metadata service 510. The first container 516 includes a first credential provider proxy 522. The first credential provider proxy 522 identifies the first container 516 to the container credential provider 514 by providing a digital signature or a source network address that is identifiable by the container credential provider 514. The second container 518 includes a second credential provider proxy 524. The second credential provider proxy 524 provides a digital signature or source network address different than that provided by the first container 516. Therefore, the first container 516 and the second container 518 may receive different credentials from the container credential provider 514. The third container 520 may request a credential directly from the instance metadata service 510. The request from the third container 520 is not distinguishable by the instance metadata service 510 from other requests from within the VM instance 508. In some implementations, a fourth container requesting a credential from the instance metadata service 510 would receive the same credential as the third container 520.

Figure 6:
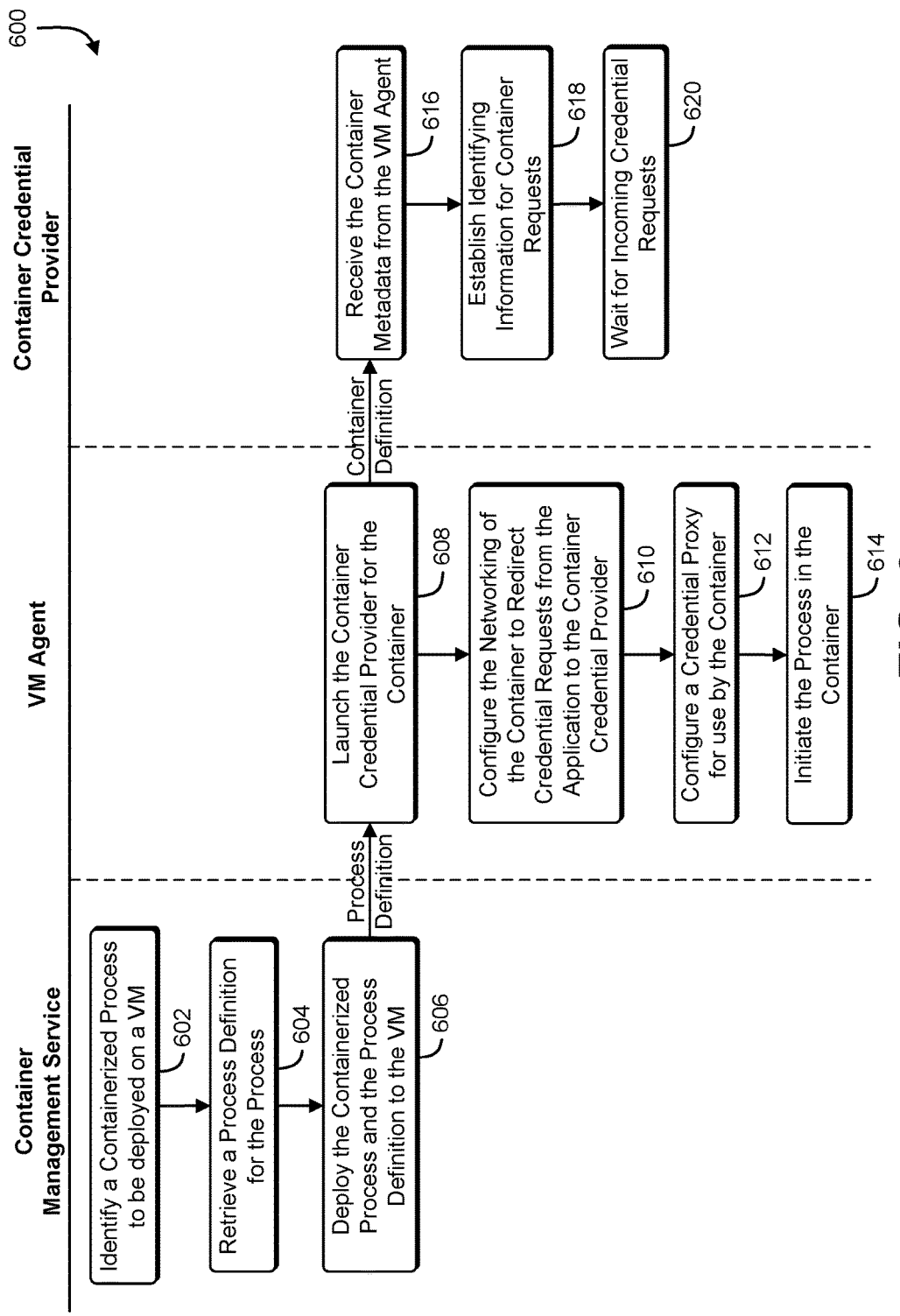
FIG. 6 shows an illustrative example of a process that, as a result of being performed by a container management service, a virtual machine agent ("VM Agent"), and a container credential provider, configures a host computer system so that credentials can be distributed to containerized processes in accordance with application metadata.

FIG. 6 shows an illustrative example of a process that, as a result of being performed by a container management service, a virtual machine agent ("VM Agent"), and a container credential provider, configures a host computer system so that credentials can be distributed to containerized processes in accordance with application metadata. A process 600 begins at block 602 where a container management service identifies a containerized process to be deployed to a virtual machine. The container management service retrieves 604 a container definition for the containerized process. The container definition includes metadata for the containerized process such as computing resource requirements, credentials, executable image files, identifiers and cryptographic keys. At block 606, the container management service deploys the containerized process to the virtual machine, in part, providing the container definition to the VM agent running within the virtual machine.

The VM agent receives the container definition from the container management service, and creates a container on the virtual machine in accordance with the container definition of the containerized process. If the container credential provider is not running, the VM agent launches 608 the container credential provider process on the virtual machine. The VM agent collects credential information from the metadata associated with the containerized process, and provides the credential information to the container credential provider in the form of a container definition. The VM agent configures 610 the networking stack of the virtual machine so that requests sent from the containers hosted on the virtual machine to a predetermined IP address and port are redirected to the container credential provider. The networking stack of the virtual machine may be configured using a software firewall, router, or bridge provided by the virtual machine. In some implementations, the network configuration of the containers may be modified so that a container directs credential requests to a different interface on the container credential provider, such as a unique network port, and the container credential provider may use the port on which the request is received to identify the requester. At block 612, the VM agent configures a credential proxy for the container. The credential proxy is provided with information that identifies the container, and cryptographic information that allows the credential proxy to apply authenticating information to credential requests sent from the container. At block 614, the VM agent initiates the containerized process in the container.

At block 616, the container credential provider receives the container metadata from the VM agent. The container metadata includes credentials for the containers. Using the container metadata, the container credential provider establishes container-identifying and request-authenticating information that allows the container credential provider to identify the source of, and authenticate, credential requests. In some examples, the container-identifying information is a list of network ports to which particular containers send credential requests. In another example, the container-identifying information is a public cryptographic key used to verify signatures on credential requests. At block 620, the container credential provider waits for incoming credential requests from the containers.

If a process running within a container requests a credential, a credential proxy within the container adds identifying and authenticating information to the request, and forwards the request to the container credential provider. The container credential provider identifies the source of the request, and authenticates the request using the metadata provided by the VM agent. The container credential provider relays the requests through the VM agent to authorization service which fulfills the request. In some implementations, the container credential provider submits a request to the authorization service. The resulting credential is returned to the container credential provider, and relayed to the container via the credential proxy.

Figure 7:
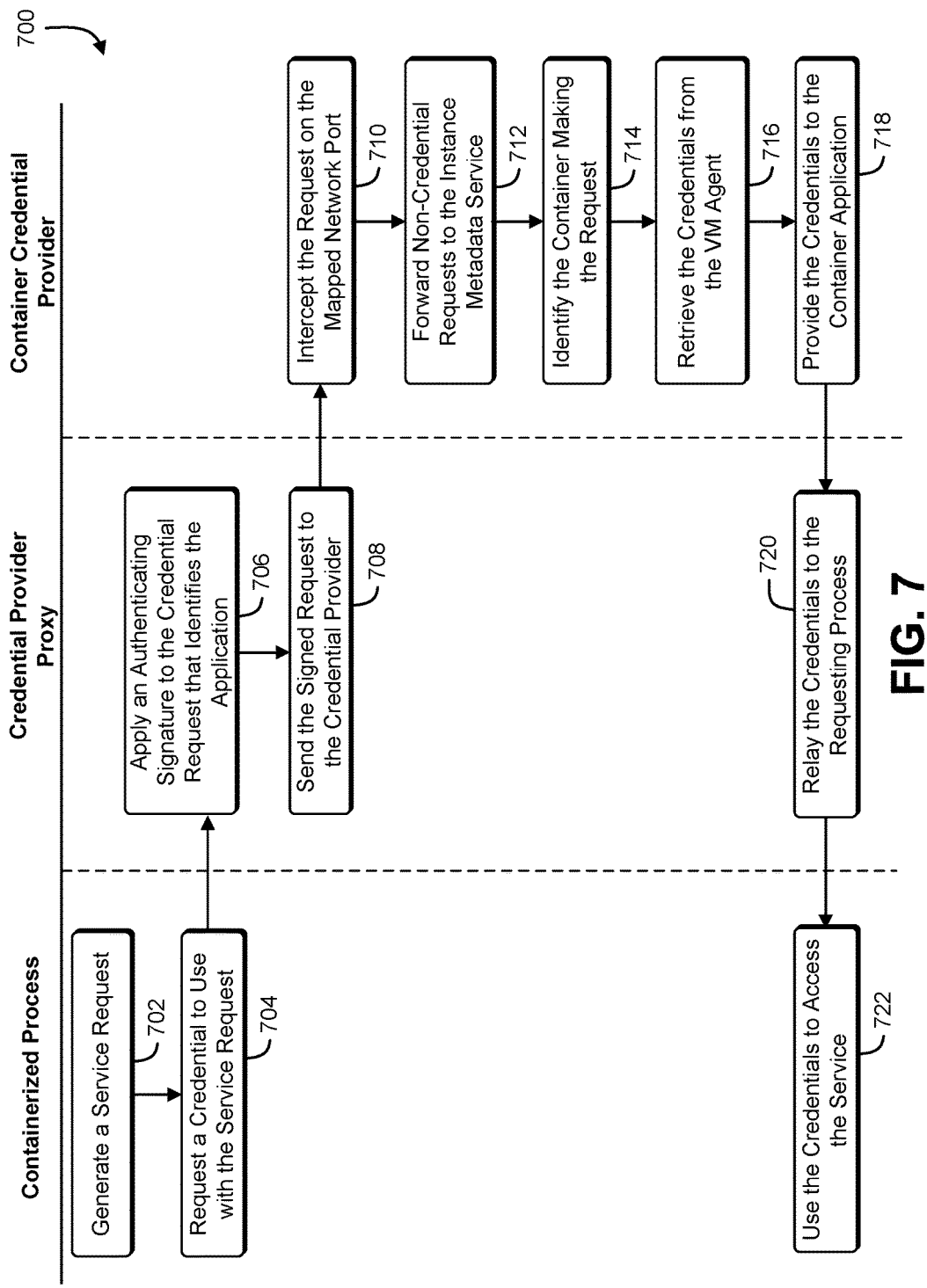
FIG. 7 shows an illustrative example of a process that, as a result of being performed by a containerized process, a credential provider proxy, and a container credential provider, provides, to the containerized process, particular credentials that are adapted to requirements of the containerized process.

FIG. 7 shows an illustrative example of a process that, as a result of being performed by a containerized process, a credential provider proxy, and a container credential provider, provides, to the containerized process, particular credentials that are adapted to requirements of the containerized process. A process 700 begins at block 702 with a containerized process generating a service request for a remote service. In various examples, the service request can be a request to store data on a remote storage service, perform a cryptographic operation using the cryptographic service, or retrieve information from a database using an online database. In order to fulfill the service request, the remote service requires an appropriate credential. At block 704, the containerized application requests, from a credential provider proxy, a credential for use with the remote service.

The credential provider proxy is a service that operates within the container namespace, the processes outgoing requests for credentials. The credential provider proxy applies 706 a digital signature to the credential request using a cryptographic key associated with the container. In some implementations, information that identifies the container is added to the credential request. The identifying information can be a container ID, a password, a code, a digital certificate, or digital signature. At block 708, the credential provider proxy since the modified credential request to the container credential provider.

The container credential provider is a service running outside the container that services requests for credentials. In some implementations, the container credential provider runs on a virtual machine or host computer system that hosts the container. The container credential provider is able to accept credential requests from a plurality of containers. At block 710, the container credential provider receives the modified credential request from the credential provider proxy. At block 712, the container credential provider examines the credential request. If the credential request is not a request that can be fulfilled by the container credential provider, the container credential provider forwards the request to an instance metadata service. The instance metadata service handles credential requests from other processes running on the host computer system such as processes not running within a container space. If the credential request is able to be fulfilled by the container credential provider, execution proceeds to block 714 where the container credential provider identifies the particular container making the request. In some examples, the particular container is identified by examining the source or destination address of the credential request. In another example, the particular container is identified using identifying information added to the request by the credential provider proxy. In yet another example, the particular containers identified using a digital signature added to the request by the credential provider proxy. At block 716, the container credential provider retrieves the requested credentials. In some implementations, the credentials are retrieved from a VM agent running on a virtual machine which hosts the container.

At block 718, the container credential provider returns the requested credentials to the credential provider proxy. The credential provider proxy receives the credentials, and relays 720 them to the containerized process. The containerized process receives the credentials, and uses 722 to the credentials to submit the service request to the remote service. Since the credentials are issued based at least in part on the identity of a particular container, the credentials may be adjusted by the issuing entity to grant rights and privileges in accordance with the needs of the process running in the particular container.

Figure 8:
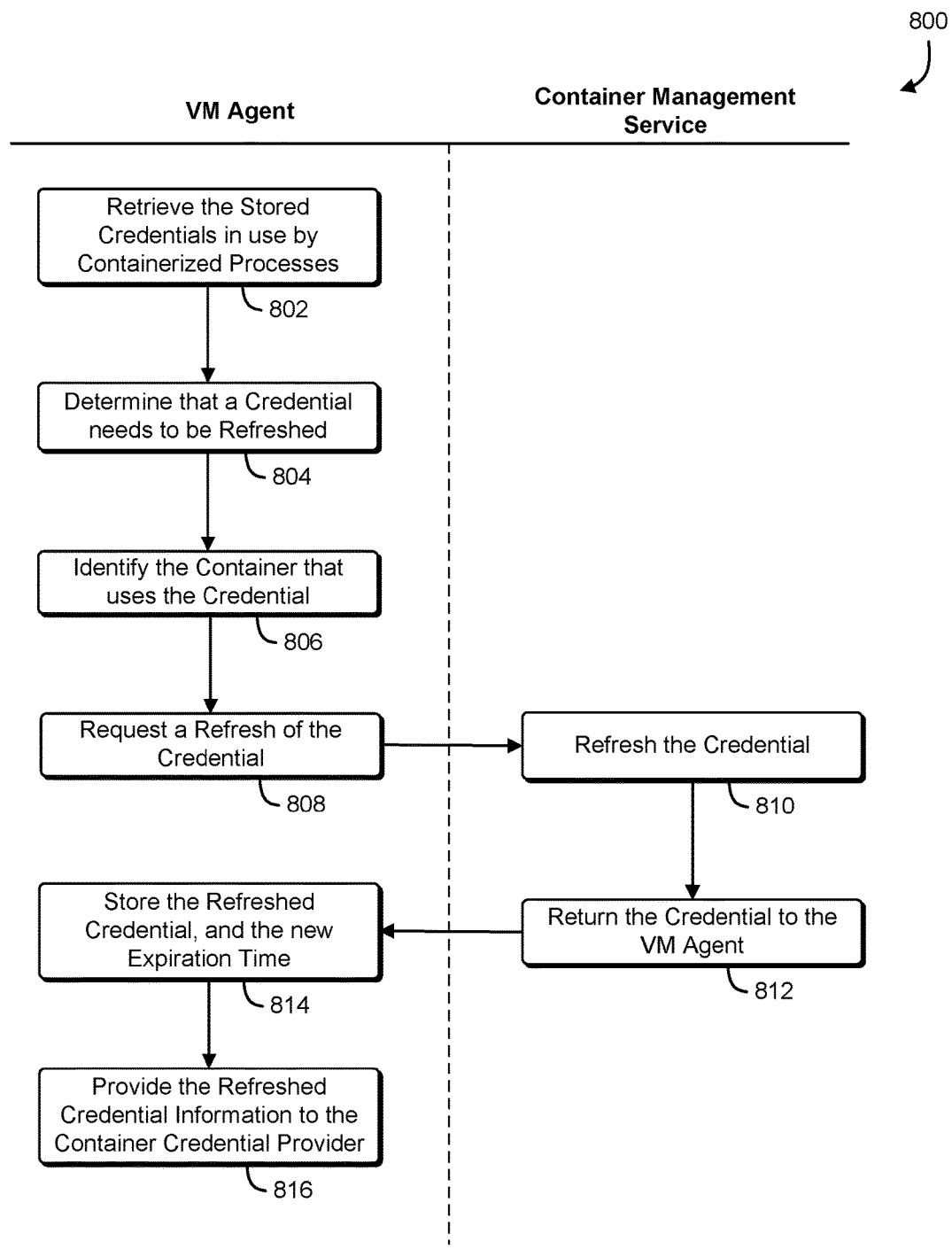
FIG. 8 shows an illustrative example of a process that, as a result of being performed by a virtual machine agent and a container management service, renews an expiring credential used by a process within a container.

FIG. 8 shows an illustrative example of a process that, as a result of being performed by a virtual machine agent and a container management service, renews an expiring credential used by a process within a container. The VM agent runs on a virtual machine which hosts one or more containers. A process 800 begins at block 802 with a VM agent retrieving, from a database accessible to the VM agent, credentials used by the one or more containers. The VM agent examines the credentials, and determines 804 whether any credentials should be renewed. In some implementations, the VM agent uses expiration information associated with the credentials to determine whether a credential should be renewed. In another implementation, the VM agent is notified by an issuer of a credential when a credential should be renewed. When a particular credential to be renewed has been identified, the VM agent identifies 806 a container that uses the particular credential. In some implementations, the VM agent identifies the container by querying a database of credential information maintained by the VM agent. At block 808, the VM agent requests, from the container management service, a renew of the particular credential.

In response to the request, the container management service requests 810 a renewed credential from a credential-issuing service. The renewed credential is returned 812 to the VM agent by the container management service. The VM agent receives the renewed credential, and stores 814 the renewed credential in a database accessible to the VM agent. At block 816, the VM agent provides the renewed credential information to a container credential provider. Future requests from the containers running on the virtual machine will be serviced by the container credential provider and will receive the renewed credential information.

In some implementations, the issuer of a credential determines that a credential is expired or about to expire, and provides, to the VM agent, an updated credential automatically. When the VM agent receives the updated credential, the VM agent provides the updated credential to the container credential provider, so that future requests for credentials from the containerized processes receive the updated credential. For example, if a remote data storage service determines that a credential issued to a process is expiring or is about to expire, the remote data storage service generates a replacement credential for the process, and then sends the replacement credential to the VM agent. The VM agent provides the replacement credential to the container credential provider, which stores the replacement credential for use in responding to future credential requests.

Figure 9:
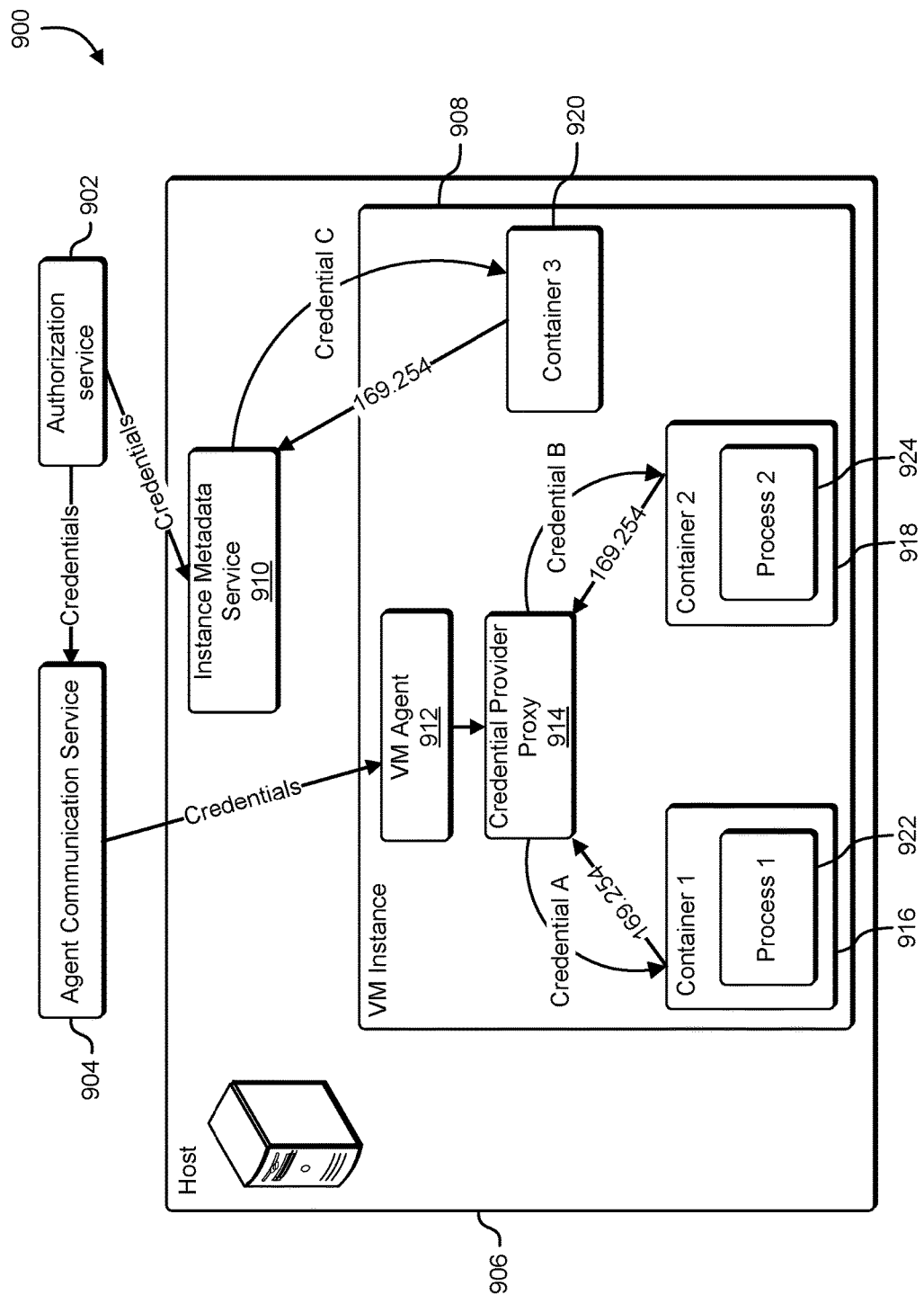
FIG. 9 shows an illustrative example of a host computer system that hosts a number of containerized processes within a virtual machine, and that distributes credentials to the containerized processes via a credential provider proxy.

FIG. 9 shows an illustrative example of a host computer system that hosts a number of containerized processes within a virtual machine, and that distributes credentials to the containerized processes via a credential provider proxy. A container-hosting environment 900 includes an authorization service 902 and an agent communication service 904 which provide credentials to containers hosted by a host computer system 906. The host computer system 906 is a server or server cluster that runs a hypervisor. The hypervisor allows the host computer system to support one or more virtual machine instances. In the example shown in FIG. 9, the host computer system 906 hosts a VM instance 908 and an instance metadata service 910. The instance metadata service 910 may run in the domain of the hypervisor or on top of an operating system running on the host computer system 906. The instance metadata service 910 may collect information associated with the VM instance 908 such as VM configuration information, networking information, credentials assigned to the VM instance 908, or other VM-instance metadata. The instance metadata service 910 exposes a web interface using a designated IP address and port. In some examples, the network stack of the VM instance 908 is configured to redirect requests to the designated IP address and port to the instance metadata service 910. In this way, containers and other processes within the VM instance 908 can access metadata associated with the VM instance.

The VM instance 908 includes a VM agent 912 that provides credentials to a number of containers. Each container runs a process in an isolated namespace. The VM agent 912 receives credential information for the containers when the containers are deployed to the VM instance 908. The credential information is retained by the VM agent 912 in a database accessible to the VM agent 912. When a container is started, container-identifying information is provided by the VM agent 912 to a credential provider proxy 914. The credential provider proxy 914 exposes an interface that is accessible to the containers running within the VM instance 908. When a container is started, the networking stack of the container is configured to redirect requests to a designated IP address and port to the interface of the credential provider proxy 914. In some implementations, the credential provider proxy 914 is omitted, and the VM agent 912 exposes an interface accessible to the containers, and the networking stack of the containers are configured to redirect requests to the interface of the VM agent 912.

The instance metadata service 910 and VM agent 912 may be used to provide credentials to the containers running within the VM instance 908. In the environment shown in FIG. 9, a first container 916 and a second container 918 are configured to receive credentials from the container credential provider 914. A third container 920 is configured to receive credentials from the instance metadata service 910. The first container 916 includes a first process 922. The first process 922 sends a request for a credential to a designated network port and address, and the request for a credential is intercepted by the credential provider proxy 914. The credential provider proxy 914 identifies the first container 916 by providing a digital signature or a source network address that is identifiable by the credential provider proxy 914. The second container 918 includes a second process 924. The second process 924 provides a digital signature or source network address different than that provided by the first container 916. Requests for credentials are forwarded from the credential provider proxy 914 to the VM agent 912, and the VM agent 912 provides a credential based at least in part on the identity of the requesting container. Therefore, the first container 916 and the second container 918 may receive different credentials from the VM agent 912. The third container 920 may request a credential directly from the instance metadata service 910. The request from the third container 920 is not distinguishable by the instance metadata service 910 from other requests from within the VM instance 908. In some implementations, a fourth container requesting a credential from the instance metadata service 910 would receive the same credential as the third container 920.

Figure 10:
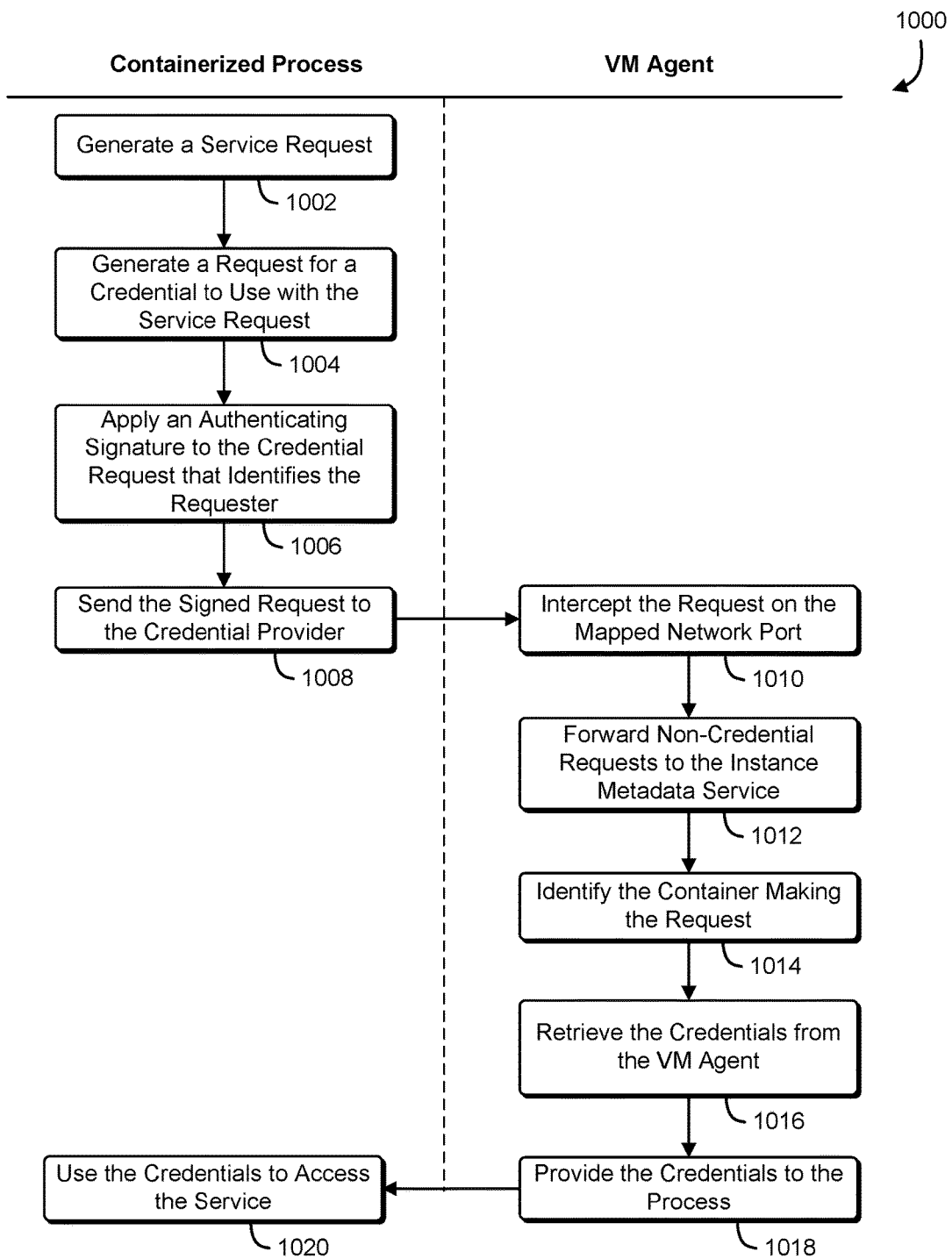
FIG. 10 shows an illustrative example of a process that, as a result of being performed by a containerized process and a VM agent, issues a credential to the containerized process in response to a credential request.

FIG. 10 shows an illustrative example of a process that, as a result of being performed by a containerized process and a VM agent, issues a credential to the containerized process in response to a credential request. A process 1000 begins at block 1002 were a containerized process generates a service request for accessing a remote service. In various examples, the remote service may be a storage service, a cryptography service, the computing service, or a web service. To facilitate access to the remote service, the containerized process generates 1004 a credential request. Credentials for the remote service may be issued by an authorization service associated with the remote service. At block 1006, the containerized process applies a digital signature that can be used to authenticate the credential request. In some implementations, the containerized process adds a token to the credential request that identifies the particular container in which the containerized process is running. The containerized process sends 1008 the signed credential request to the VM agent.

At block 1010, the VM agent receives the credential request. In some implementations, the VM agent receives the credential request by intercepting a communication directed to a designated network address and port. A network stack, network firewall, network bridge, or network router may be reconfigured to direct credential requests addressed to the designated network address and port to the VM agent. In the example of FIG. 9, the designated network address is 169.254. At block 1012, the VM agent examines the credential request and determines whether the request can be fulfilled by the VM agent. In various examples, the VM agent may determine that the credential request cannot be fulfilled when the credential request is a request for metadata other than a credential, a request for metadata associated with the virtual machine, or an appropriate credential is not available to the VM agent. If the VM agent determines that the credential request cannot be fulfilled by the VM agent, the VM agent forwards the request to an instance metadata service. The instance metadata service is a service that provides metadata associated with a virtual machine that hosts the containerized application.

If the VM agent determines that the credential request can be fulfilled, the VM agent identifies 1014 the particular container making the credential request. In some examples, the particular container is identified using a token provided with the credential request. In another example, the particular container is identified based at least in part on the source address of the credential request. At block 1016, the VM agent retrieves the credentials requested by the containerized application. The credentials may be retrieved from a data cache accessible to the VM agent, or retrieved from a credential provider associated with the remote service. At block 1018, the VM agent provides the credentials to the containerized process. The containerized process receives the credentials, and uses 1020 the credentials to access the remote service.

Figure 11:
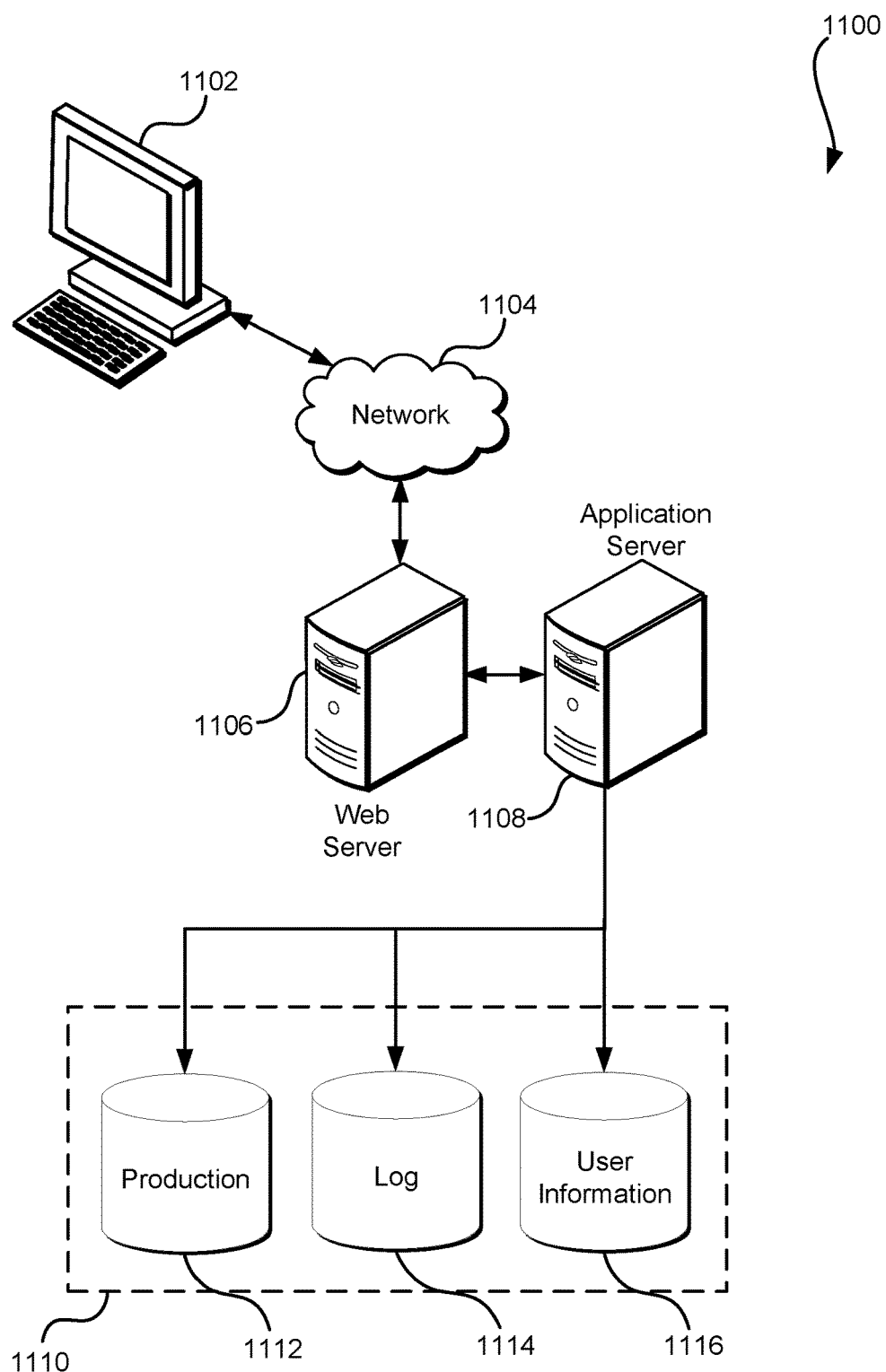
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform processes such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually, and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes, and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the client device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

A server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python or TCL, as well as combinations thereof. The server(s) may also include database servers, including without limitation those commercially available from Oracle®, Microsoft®, Sybase and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method, or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

Note that the term "digital signature" includes any information usable to cryptographically verify authenticity of a message including information generated using an RSA-based digital scheme (such as RSA-PSS), the digital signature algorithm (DSA) and the elliptic curve digital signature algorithm, the ElGamal signature scheme, the Schnorr signature scheme, the Pointcheval-Stern signature algorithm, the Rabin signature algorithm, pairing-based digital signature schemes (such as the Boneh-Lynn-Schacham signature scheme), undeniable digital signature schemes, and others. Further, message authentication codes (such as hash-based message authentication codes (HMACs), keyed cryptographic hash functions, and other types of information may also be used as digital signatures.

Note that a system is said to be configured to trust a public cryptographic key if logic with which the system is configured to operate is dependent on whether an attempt to verify a digital signature with the public cryptographic key is successful. Similarly, a system is said to be configured to trust a symmetric cryptographic key if logic with which the system is configured to operate is dependent on whether an attempt to verify a digital signature with the symmetric cryptographic key is successful.

In various embodiments, data objects such as digital signatures may be cryptographically verifiable. In one example, cryptographically verifiable data objects are created to be cryptographically verifiable by the system to which the data object is to be provided or another system that operates in conjunction with the system to which the data object is to be provided. For example, the data object may be encrypted so as to be decryptable by the system that will cryptographically verify the data object, where the ability to decrypt the data object serves as cryptographic verification of the data object. As another example, the data object may be digitally signed (thereby producing a digital signature of the data object) such that the digital signature is verifiable by the system that will cryptographically verify the data object. In other examples, both encryption and digital signatures are used for cryptographic verifiability and/or security. The key used to encrypt and/or digitally sign the data object may vary in accordance with various embodiments and the same key is not necessarily used for both encryption and digital signing, where applicable. In some embodiments, a key used to encrypt the data object is a public key of a public/private key pair where the private key of the key pair is maintained securely by the system to which the data object is to be provided, thereby enabling the system to decrypt the data object using the private key of the key pair. Using the public key to encrypt the data object may include generating a symmetric key, using the symmetric key to encrypt the data object, and encrypting the symmetric key using the public key, where the encrypted symmetric key is provided to a system with the encrypted data object to enable the system to use the corresponding private key to decrypt the symmetric key and use the decrypted symmetric key to decrypt the data object. Further, in some embodiments, the data object is digitally signed using a private key of a public/private key pair corresponding to the computer system that encrypts and/or digitally signs the data object (e.g., a user device). For example, an application may be provisioned with the private key and the data object may include a certificate for the private key for use by a system for verification of the digital signature of the data object. Other variations, including variations where a symmetric key shared between the user computer and the system that cryptographically verifies the data object can be used to encrypt and/or digitally sign the data object.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   under the control of one or more computer systems configured with executable instructions, receiving, from a credential provider proxy, a request for a credential;
   determining an identity of a container based at least in part on information provided with the request by the credential provider proxy, the information including a digital signature generated using a private cryptographic key of a public-private cryptographic key pair, with a public key of the public-private cryptographic key pair available to a container metadata provider;
   authenticating the request for the credential using the information provided by the credential provider proxy;
   authorizing the request for the credential based at least in part on the identity, of the container;
   acquiring, on behalf of the container, the credential, wherein the credential grants access rights to a service, the access rights based at least in part on the identity of the container; and
   providing the credential to the container via the credential provider proxy.

2. The computer-implemented method of claim 1, wherein the request for the credential is received from the credential provider proxy as a result of the credential provider proxy sending the request via a network interface to a designated network address and port.

3. The computer-implemented method of claim 2, wherein determining the identity of the container is accomplished at least in part by:
   determining a source network address for the request; and
   identifying the container based at least in part on a source network address.

4. The computer-implemented method of claim 2, wherein:
   the designated network address and port is dependent on the identity of the container; and
   determining the identity of the container is accomplished at least in part by determining the designated network address and port on which the request was received.

5. A system, comprising a computing device configured to implement a container management service and a container metadata provider, wherein:
   the container management service is configured to provide an application programming interface for launching and managing containerized applications;
   the container metadata provider is configured to acquire metadata associated with a container hosted by the computing device;
   a metadata proxy is configured to be deployed to the container;
   the container metadata provider is configured to receive, from the metadata proxy, a request for metadata, the request for metadata including information that identifies the container, the information including a digital signature generated using a private cryptographic key of a public-private cryptographic key pair, with a public key of the public-private cryptographic key pair provided to the container metadata provider; and
   in response to the request for metadata, the container metadata provider is configured to provide, to the metadata proxy, the metadata associated with the container.

6. The system of claim 5; wherein:
   the request for metadata is configured to be directed by the metadata proxy to a designated network address; and
   a network stack used by the container is configured to redirect the request for metadata to the container metadata provider.

7. The system of claim 5, wherein:
   an agent on the computing device is configured to collect the metadata associated with the container from a container definition file; and
   the container definition file is configured to be used by the agent to deploy and launch the container.

8. The system of claim 7, wherein:
   the metadata proxy is configured to receive the request for metadata from a process running within the container; and
   the process is configured to add, to the request for metadata, the information that allows the container metadata provider to identify the container from which the request for metadata originated.

9. The system of claim 8, wherein the information that allows the container metadata provider to identify the container is a container token.

10. The system of claim 5, wherein:
    the metadata associated with the container is a credential for accessing a service; and
    the credential is configured to deny, to the service; access rights that are not required for operation of the container.

11. The system of claim 5, wherein:
    the container metadata provider is configured to determine that a second request for metadata cannot be fulfilled; and
    as a result of determining that the second request for metadata cannot be fulfilled, the container metadata provider is configured to forward the second request for metadata to a different metadata service for fulfillment.

12. A non-transitory computer-readable storage medium having stored thereon executable instructions that, as a result of being executed by one or more processors of a computer system, cause the computer system to at least:

deploy, within a container hosted by a container runtime implemented on the computer system, a process based at least in part on a container definition provided by a client;

deploy a metadata proxy in the container;

collect, from the container definition, metadata associated with the process;

provide the metadata associated with the process to an application metadata provider, the application metadata provider having an interface accessible to the metadata proxy;

receive, at the application metadata provider and via the metadata proxy, a request for metadata from the process, wherein the metadata includes a digital signature generated using a private cryptographic key of a public-private cryptographic key pair, with a public key of the public-private cryptographic key pair provided to the application metadata provider; and fulfill the request for metadata based at least in part on the metadata associated with the process.

13. The non-transitory computer-readable storage medium of claim 12, wherein the metadata associated with the process includes at least one of credentials, security roles, process identifiers, operational parameters, and cryptographic keys.

14. The non-transitory computer-readable storage medium of claim 12, wherein the interface accessible to the metadata proxy is part of an application programming interface provided by the container runtime; and wherein, as a result of being executed by the one or more processors, the instructions further cause the computer system to:

forward metadata requests sent to the application programming interface to the application metadata provider.

15. The non-transitory computer-readable storage medium of claim 12, wherein, as a result of being executed by the one or more processors, the instructions further cause the computer system to operate the application metadata provider outside the container.

16. The non-transitory computer-readable storage medium of claim 15, wherein, as a result of being executed by the one or more processors, the instructions further cause the computer system to:

implement a virtual machine on a hypervisor; and wherein the container runtime and the application metadata provider operates within the virtual machine.

17. The non-transitory computer-readable storage medium of claim 12, wherein the container definition specifies credentials, roles, execution constraints, and configuration information associated with the process.

18. The non-transitory computer-readable storage medium of claim 12, wherein, as a result of being executed by the one or more processors, the instructions further cause the computer system to fulfill the request for metadata by providing a credential to the process, the credential acquired from an authorization server associated with an online service.

19. The non-transitory computer-readable storage medium of claim 18, wherein, as a result of being executed by the one or more processors, the instructions further cause the computer system to:

receive an updated credential from a credential issuer associated with the online service; and provide the updated credential to the application metadata provider.

* * * * *